US012084177B2

(12) United States Patent
Sathya (10) Patent No.: US 12,084,177 B2
(45) Date of Patent: Sep. 10, 2024

(54) AIR AND ROAD VEHICLE SYSTEM

(71) Applicant: Santh Sathya, Chuluota, FL (US)

(72) Inventor: Santh Sathya, Chuluota, FL (US)

(73) Assignee: LUFTCAR LLC, Appollo Beach, FL (US)

(*) Notice: Subject to any disclaimer, the term of this patent is extended or adjusted under 35 U.S.C. 154(b) by 194 days.

(21) Appl. No.: 17/744,040

(22) Filed: May 13, 2022

(65) Prior Publication Data
US 2023/0034488 A1 Feb. 2, 2023

Related U.S. Application Data

(63) Continuation-in-part of application No. 17/354,739, filed on Jun. 22, 2021, now abandoned.

(60) Provisional application No. 63/253,814, filed on Oct. 8, 2021.

(51) Int. Cl.
| | |
|---|---|
| *B64C 37/00* | (2006.01) |
| *B60F 5/02* | (2006.01) |
| *B64C 29/00* | (2006.01) |
| *G05D 1/00* | (2024.01) |

(52) U.S. Cl.
CPC .............. *B64C 37/00* (2013.01); *B60F 5/02* (2013.01); *B64C 29/00* (2013.01); *G05D 1/0088* (2013.01)

(58) Field of Classification Search
CPC ............ B64C 37/00; B64C 37/02; B60F 5/02
See application file for complete search history.

(56) References Cited

U.S. PATENT DOCUMENTS

| | | | | | |
|---|---|---|---|---|---|
| 2,215,003 | A | * | 9/1940 | Johnson | B64C 37/00 244/234 |
| 2,410,234 | A | * | 10/1946 | Read | B64C 37/00 244/118.5 |
| 2,532,159 | A | * | 11/1950 | Fulton, Jr. | B64C 37/00 244/120 |
| 2,557,894 | A | * | 6/1951 | Siesel | B64C 37/00 244/50 |
| 2,593,785 | A | * | 4/1952 | Nye | B64C 37/00 244/2 |
| 2,619,301 | A | * | 11/1952 | Hall | B60F 5/02 244/54 |

(Continued)

FOREIGN PATENT DOCUMENTS

GB 2455362 A 6/2009

*Primary Examiner* — Tien Q Dinh
*Assistant Examiner* — William L Gmoser
(74) *Attorney, Agent, or Firm* — Jason T. Daniel, Esq.; Daniel Law Offices, P.A.

(57) ABSTRACT

An air and road vehicle system includes a road vehicle having a chassis, a plurality of wheels, an engine, and a cabin area. A flight vehicle having a main body, wings, flight control surfaces, and a plurality of propulsion devices is removably coupled to the road vehicle by a plurality of docking mechanisms. In the connected orientation, the top end of the road vehicle is connected to the bottom surface of the wings, and the back end of the road vehicle is connected to the main body via an elongated catch tongue. Controllers on the flight vehicle and road vehicle are communicatively linked wirelessly or via hardwire receptacles. In the disconnected orientation, the road vehicle is functional as a road motor vehicle, and in the connected orientation, the flight vehicle and the road vehicle are functional for flight in a vertical or horizontal orientation.

15 Claims, 10 Drawing Sheets

(56) References Cited

U.S. PATENT DOCUMENTS

| | | | |
|---|---|---|---|
| 2,624,530 A * | 1/1953 | Hanssen | B64C 37/00 244/2 |
| 2,767,939 A * | 10/1956 | Taylor | B60F 5/02 244/49 |
| 2,770,427 A * | 11/1956 | Schreffler | B64C 37/00 244/2 |
| 3,017,137 A * | 1/1962 | Helmke | B64C 37/00 244/120 |
| 3,605,935 A * | 9/1971 | Gilbert | B64D 1/22 296/35.3 |
| 3,645,474 A * | 2/1972 | Arbuse | B64C 37/00 244/2 |
| 4,358,072 A * | 11/1982 | Williamson | B64C 37/00 244/234 |
| 4,537,373 A * | 8/1985 | Butts | B64C 37/00 244/50 |
| 6,086,014 A | 7/2000 | Bragg, Jr. | |
| 6,517,026 B1 | 2/2003 | Smith | |
| 7,946,530 B1 * | 5/2011 | Talmage, Jr. | B64D 25/12 244/140 |
| 8,528,852 B2 | 9/2013 | Farrag | |
| 9,027,879 B1 | 5/2015 | Talmage, Jr. | |
| 10,422,649 B2 | 9/2019 | Engelman et al. | |
| 11,034,443 B2 * | 6/2021 | Frolov | B64U 10/25 |
| 2011/0163197 A1 * | 7/2011 | Farrag | B64C 37/00 244/2 |
| 2011/0177748 A1 | 7/2011 | Luo | |
| 2016/0244160 A1 | 8/2016 | Colten et al. | |
| 2018/0044000 A1 * | 2/2018 | Venturelli | B60L 53/68 |
| 2018/0126871 A1 | 5/2018 | Martinotti | B60L 15/36 |
| 2018/0257448 A1 * | 9/2018 | Schreiner | B64C 25/52 |
| 2018/0297698 A1 | 10/2018 | Dhall | |
| 2018/0354617 A1 | 12/2018 | Frolov et al. | |
| 2019/0160901 A1 * | 5/2019 | Doyle | B64C 3/56 |
| 2019/0375259 A1 * | 12/2019 | Stadler | B60K 11/06 |
| 2020/0140081 A1 | 5/2020 | Levy | |

* cited by examiner

AIR AND ROAD VEHICLE SYSTEM

CROSS-REFERENCE TO RELATED APPLICATIONS

This application is a continuation-in-part to and claims the benefit of U.S. application Ser. No. 17/354,739 filed on Jun. 22, 2021, and claims priority to U.S. Application Ser. No. 63/253,814 filed on Oct. 8, 2021, the contents of each of which are incorporated herein by reference.

TECHNICAL FIELD

The present invention relates generally to passenger vehicles and cargo delivery vehicles, and more particularly to a vehicle system capable of operating in the air and on roadways.

BACKGROUND

The statements in this section merely provide background information related to the present disclosure and may not constitute prior art.

There are no shortage of commercially available automobiles, airplanes and helicopters for use in conveying individuals and cargo from one location to another. Although useful in their own rights, each of these systems comprise a unibody design that is suited for a single mode of travel. In this regard, it has been a longstanding dream to develop a vehicle that is capable of operating on roads, and as a flying vehicle.

Indeed, the concept of flying cars has been around for decades, but these designs typically comprised some type of airplane whose fixed wings could be folded to permit limited operation as a ground vehicle. Unfortunately, these designs were impractical as the vehicle had to tow the folded wings when driving and would still require a long runway to take off and land. However, recent innovations in vertical takeoff and landing (VTOL) engines have sparked new opportunities for flying craft.

As such, it would be beneficial to provide a multi-modal air and road vehicle system having components that can be selectively joined to allow a user to operate the vehicle on both roadways and in flight, without the drawbacks of the above noted concepts.

SUMMARY OF THE INVENTION

The present invention is directed to an air and road vehicle system. One embodiment of the present invention can include a road vehicle having a chassis, a plurality of wheels, an engine, and a cabin area. The system also includes a flight vehicle having a main body, wings, flight control surfaces, and a plurality of propulsion devices. The flight vehicle and the road vehicle can be removably joined together by a plurality of docking mechanisms.

In one embodiment, the top end of the road vehicle can be connected to the bottom surface of the wings, and the back end of the road vehicle can be connected to the main body via an elongated catch tongue. Each of the flight vehicle and the road vehicle can include onboard controllers which can communicate wirelessly or via hardwires via receptacles in the road vehicle and catch tongue connection.

In the disconnected orientation, the road vehicle can drive along any roadway in an autonomous, semi-autonomous, or manual setting. In the connected orientation, the flight vehicle and the road vehicle are configured to takeoff, fly and land.

In one embodiment, the flight vehicle can function in sustained vertical flight, sustained horizontal flight, and the propulsion devices can rotate so as to operate as a vertical takeoff and landing craft.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described throughout this document, the term "about," "approximately," "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include opposing strips of hook and loop material (i.e., Velcro®), attractively oriented magnetic elements, floating cable connectors, wireless connectors, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described herein, the term "connected orientation" and "assembled vehicle system" are used interchangeably to describe the system when the road vehicle and air vehicle are coupled together so as to be ready for flight.

As described herein, the term "horizontal flight mode" refers to when the assembled vehicle system is flying directly horizontally or substantially horizontally, such as when it would be climbing, descending, taking off or landing along a runway. The phrase "vertical flight mode" refers to when the assembled vehicle system is flying vertically, hovering, taking off or landing vertically or substantially vertically.

The term "flight control surfaces" used herein refers to any movable flap or panel on or along a wing or tail assembly capable of producing roll, yaw or pitch maneuvers causing the assembled vehicle system to ascend, descend or change its direction of travel. These maneuvers are associated with the roll, yaw, and pitch axes of the craft, so as to allow the craft to be directionally variable between horizontal and vertical attitudes for flying the vehicle either vertically while the fuselage remains in horizontal attitude or substantially horizontal as in normal flight.

FIGS. 1-10 illustrate one embodiment of an air and road vehicle system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 1:
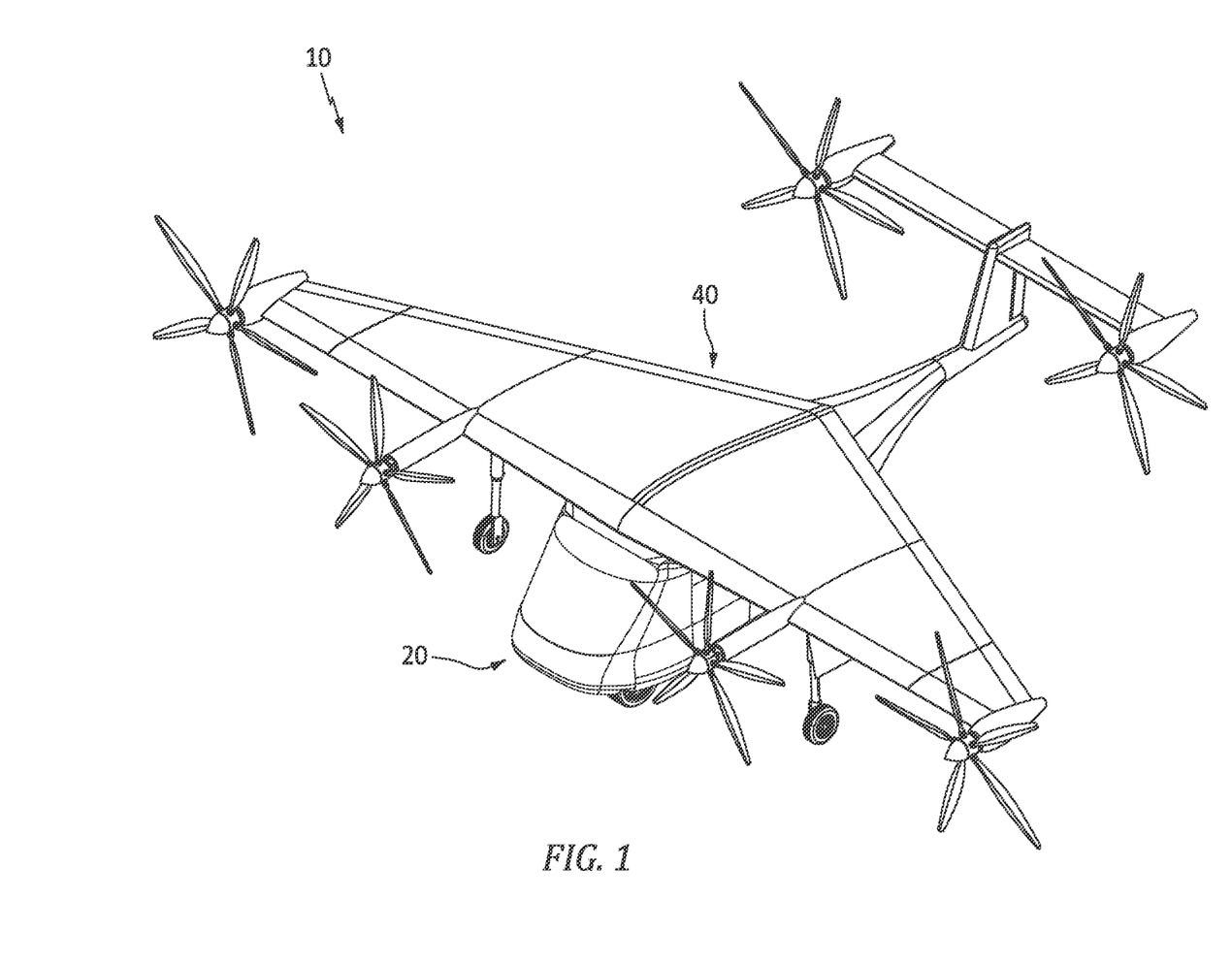
FIG. 1 is a perspective view of the air and road vehicle system in the assembled orientation for horizontal flight that is useful for understanding the inventive concepts disclosed herein.

FIG. 1, illustrates one embodiment of the assembled vehicle system 10 that includes, essentially, a road driving vehicle 20 and a flight vehicle 40 that are removably joined together to transport individuals or cargo on the road and through the air.

Figure 2:
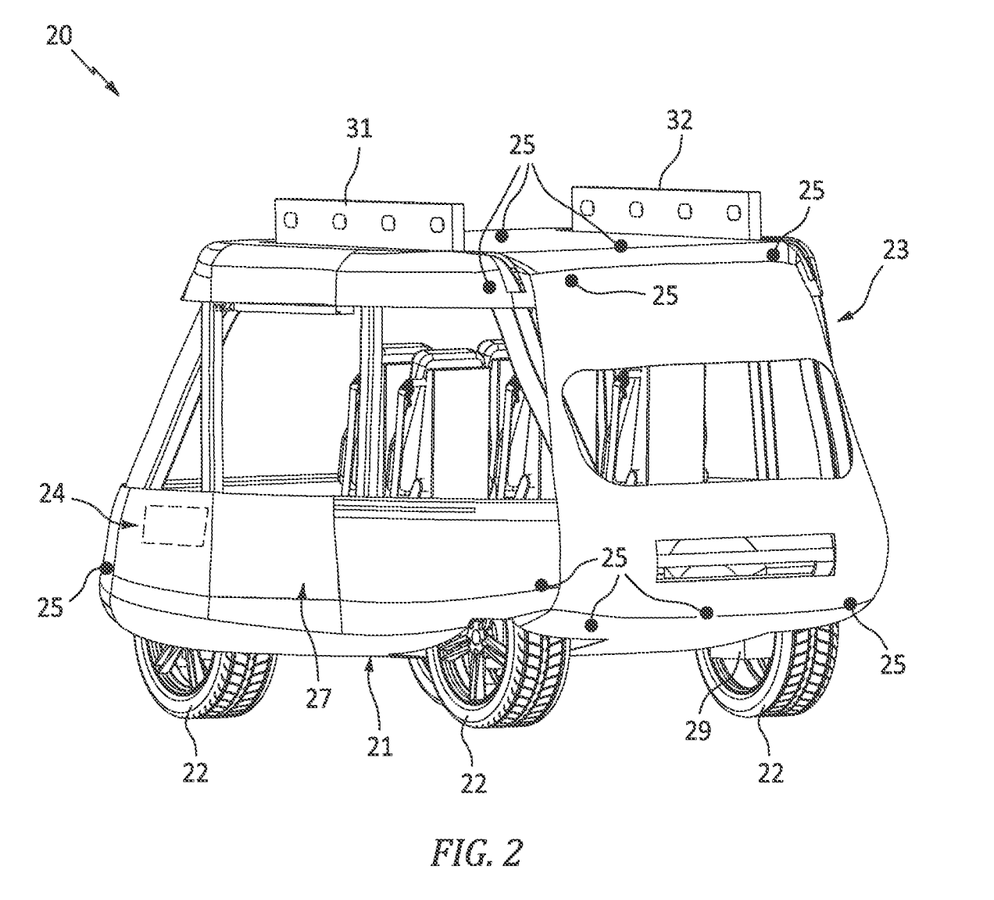
FIG. 2 is a perspective view of the road vehicle of the system, in accordance with one embodiment of the invention.
Figure 3:
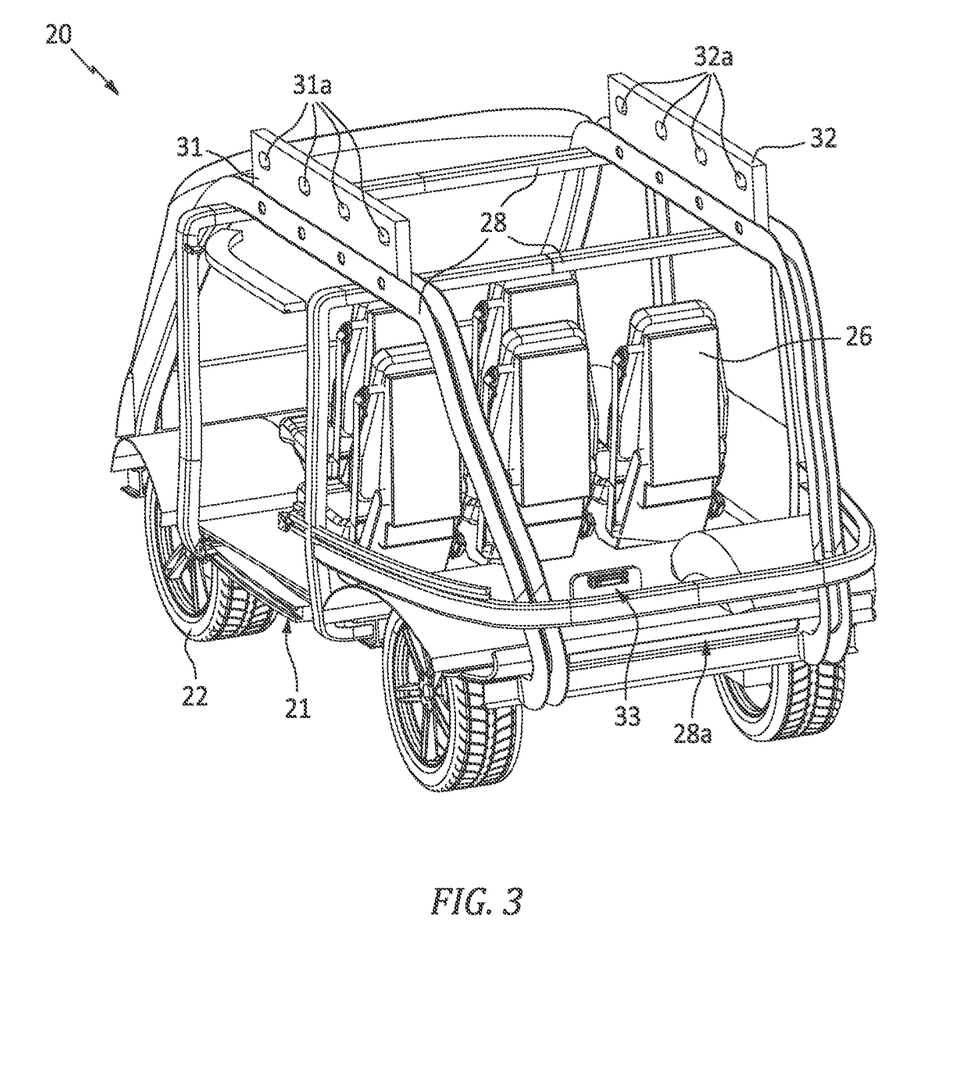
FIG. 3 is a perspective view of the road vehicle of the system with the body panels removed, in accordance with one embodiment of the invention.

As shown best at FIGS. 2 and 3, the road driving vehicle 20 can include a vehicle chassis 21 having a plurality of wheels 22 and a passenger cabin 23 into which passengers or cargo can reside. In the preferred embodiment, the vehicle can be electrically operated and can include an onboard hydrogen fuel cell, batteries and/or other suitable power source along with an electric motor, drivetrain, transmission system, steering system, braking system, operator controls (e.g., steering wheel, acceleration, and brake pedals) and the like to permit the vehicle to operate as an electric automobile. Of course, other embodiments are contemplated wherein the vehicle includes a gasoline or other type of engine system, and respective components.

In the preferred embodiment, the road driving vehicle will include at least one onboard computer control system 24 having any number of discrete or integrated circuits such as computer processors, memory, user interface components and communication devices such as a wireless transceiver (e.g., cellular transceiver, Wi-Fi transceiver, Bluetooth transceiver, etc.).

The control system 24 can include or can be connected to any number of integrated or discrete onboard sensors 25 such as optical sensors, radar, lidar, and location identification sensors (e.g., GPS system or cellular navigation transceivers) to permit autonomous and/or semi-autonomous operation of the vehicle on a roadway. Additionally, the sensors 25 can be provided along the vehicle to aid in identifying, orienting, and positioning the road vehicle with the flight vehicle in the manner described below to allow the vehicles to form the assembled vehicle system for flight.

In one embodiment, the control system 24, will be able to communicate with the onboard controller 54 of the flight vehicle 40 via the below described docking plug 33 and/or wireless transceivers in order to permit a vehicle occupant to utilize the onboard operator controls of the driving vehicle to control the operation of the assembled vehicle system during flight.

The road vehicle 20 can include any number of different shapes and sizes and can include any number of seats 26 within the cabin 23 to accommodate passengers, and can include one or more doors 27 along the sides, front and/or back of the vehicle to allow ingress and egress of the cabin. In the preferred embodiment, the cabin can also include a structural cage 28 designed to protect occupants in the event of a crash.

The road vehicle will preferably be manufactured to meet or exceed all applicable safety requirements outlined by The National Highway Traffic Safety Administration (NHTSA) and/or other governing bodies so as to be certified to operate as a motor vehicle on public roadways. Likewise, the road vehicle will preferably be manufactured to meet or exceed all applicable safety requirements outlined by the National Transportation Safety Board so as to be certified as an aircraft passenger cabin when utilized with the below described flight vehicle.

To this end, the road vehicle may be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

In one embodiment, the road vehicle can include a pair of docking rails 31 and 32 that are positioned along the top surface of the cabin 23, and preferably that are directly connected to the structural frame 28. Each of the docking rails having a plurality of openings 31a and 32a for engaging the rods 66b and 67b, respectively of the docking clamps located on the flight vehicle.

In one embodiment, the road vehicle can include a docking plug 33 that can be removably connected to the below described connector pin receptacle 63 of the flight vehicle. In various embodiments, the docking plug and/or connector pin receptacle can each include any type of male or female wire connectors and/or wire harness connectors each having any number of integrated wires, terminals, and other such components capable of permitting the electronic systems of the road vehicle and flight vehicle to communicate in the manner described herein when the respective plug and receptacle are connected together.

In the preferred embodiment, the docking plug 33 can be positioned along the back end of the vehicle. Adjacent to the docking plug, the vehicle frame can include a generally rectangular structure having a central opening 28a, and the outer body panel includes an elongated docking aperture 29 located adjacent to the frame opening. As will be described below, the frame opening 28a and docking aperture 29 can function to receive the docking catch tongue 62 of the flight vehicle when the two vehicles are joined together.

Figure 4:
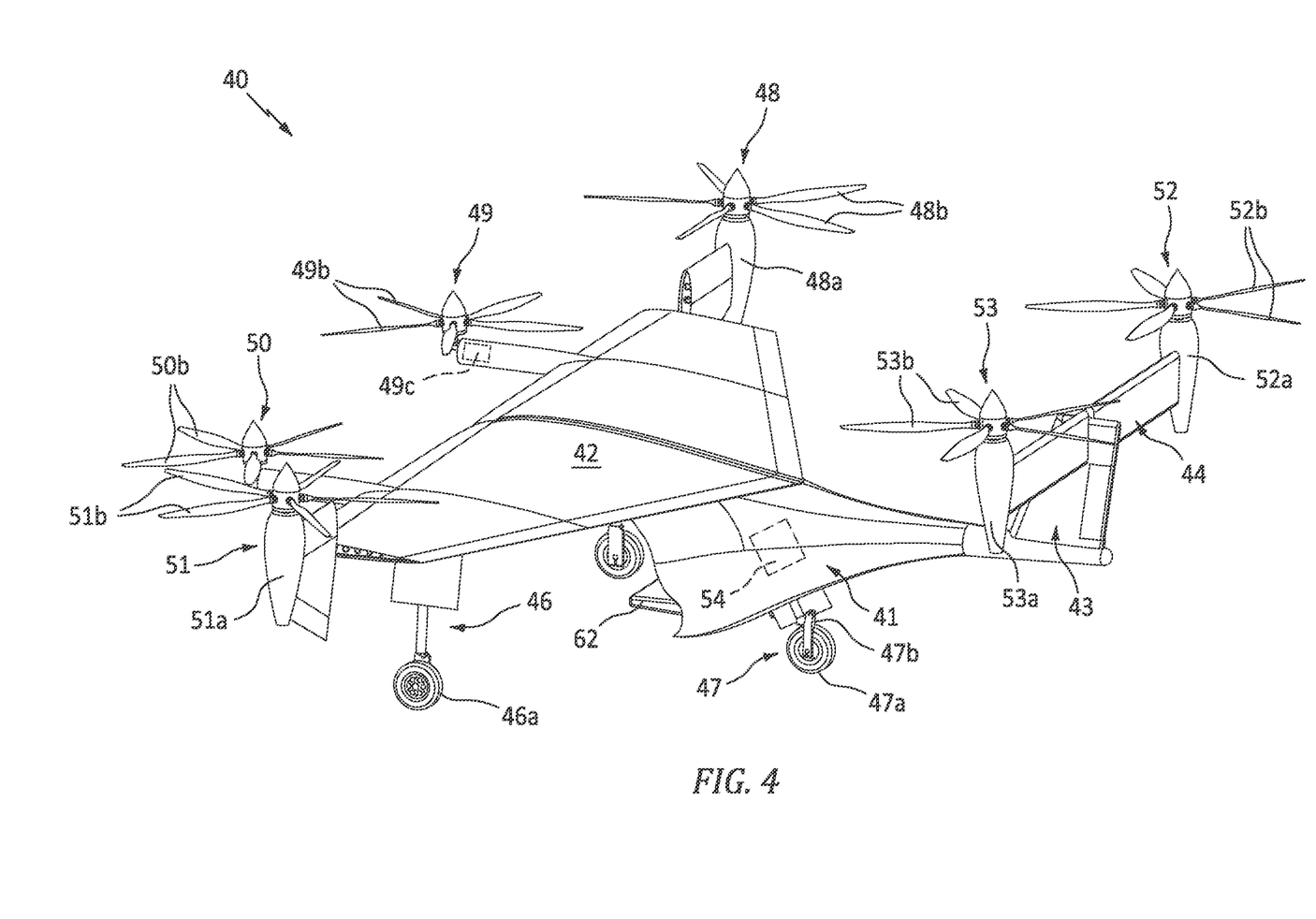
FIG. 4 is a perspective view of the flight vehicle of the system, in accordance with one embodiment of the invention.
Figure 5:
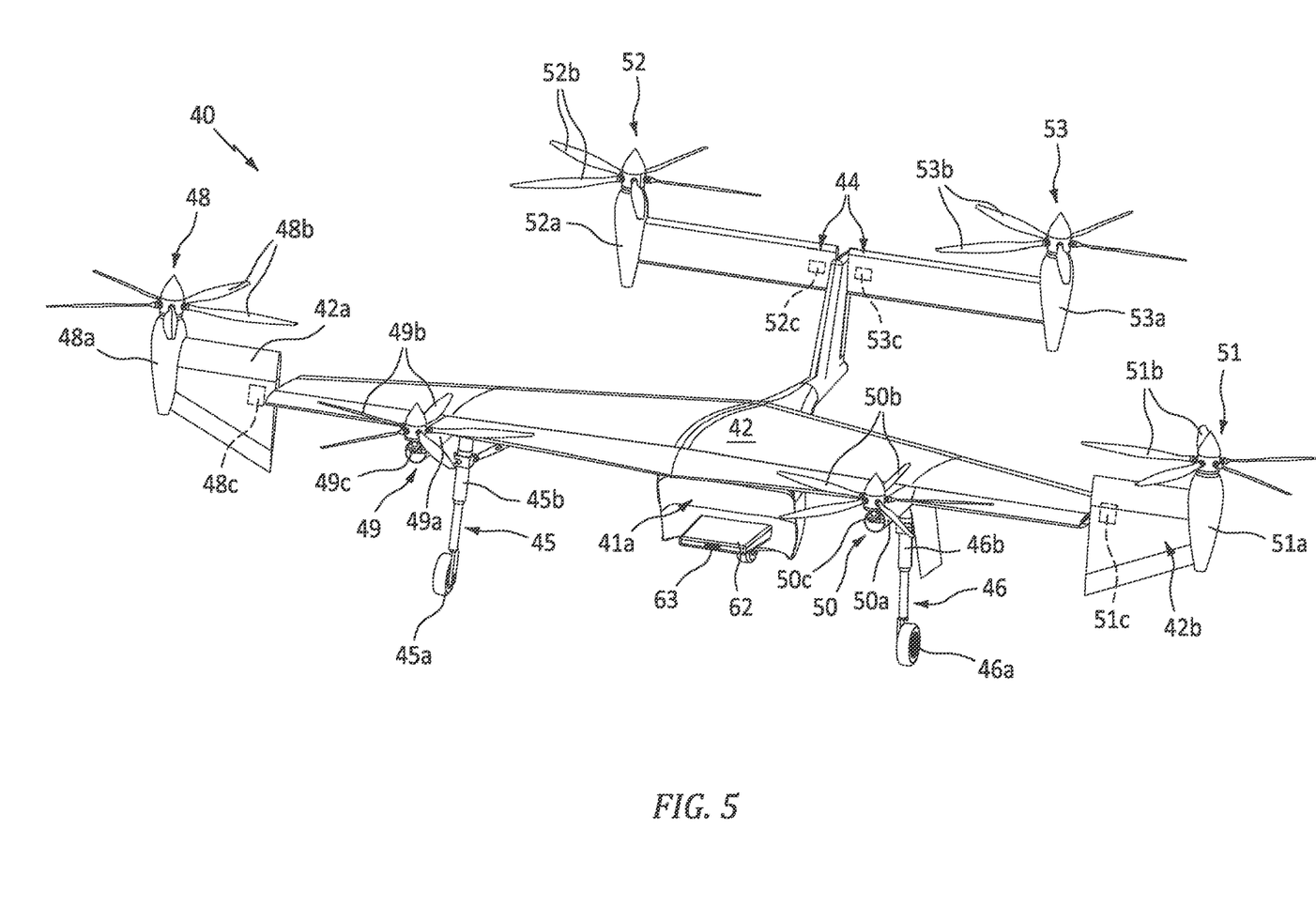
FIG. 5 is another perspective view of the flight vehicle of the system, in accordance with one embodiment of the invention.
Figure 6:
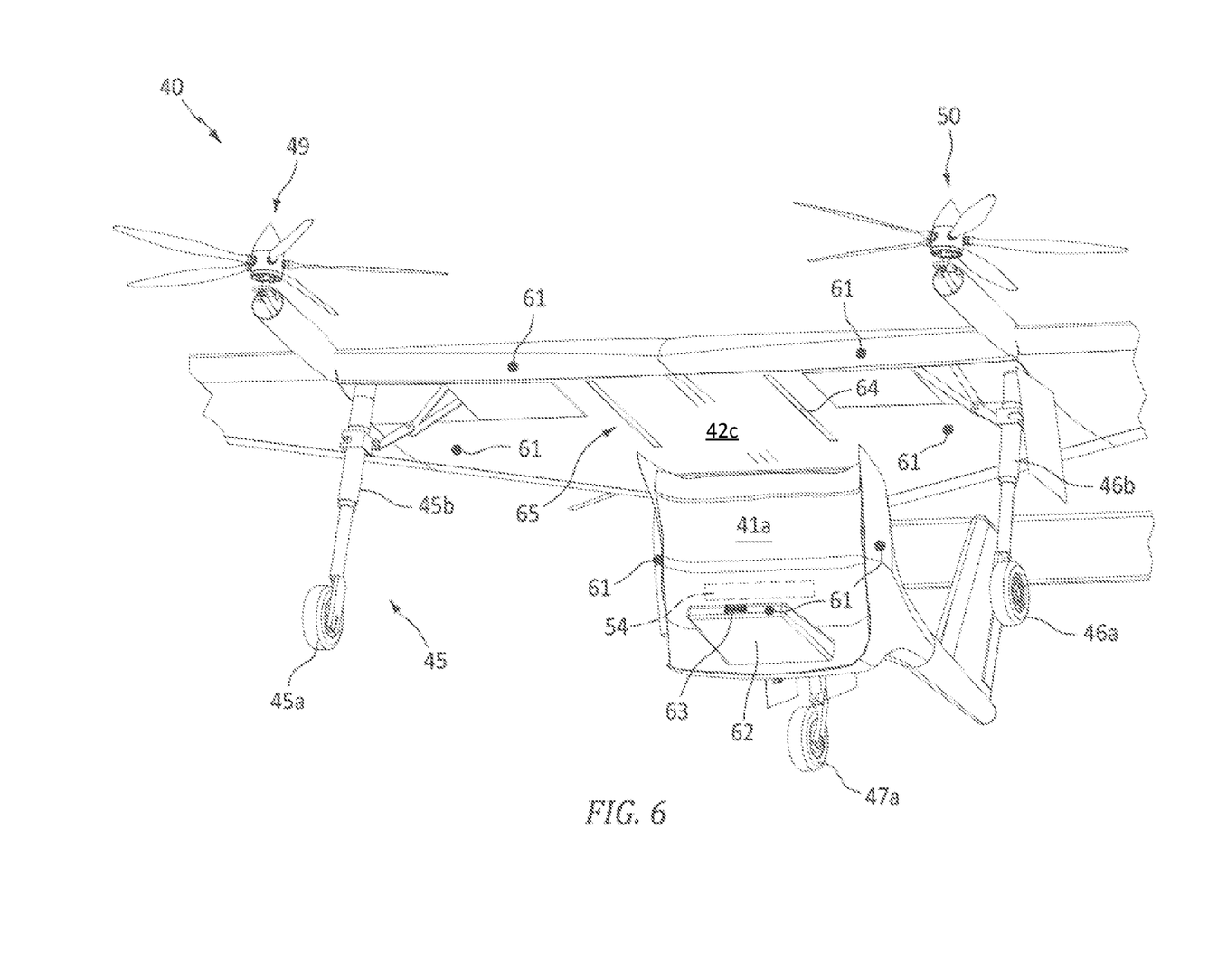
FIG. 6 is yet another perspective view of the flight vehicle of the system, in accordance with one embodiment of the invention.

As shown best at FIGS. 4 and 5, the flight vehicle 40 can include a fuselage 41 that is connected to a set of horizontal wings 42, a vertical tail 43 and rear horizontal stabilizers 44. Moreover, any number of flight control surfaces such as a rudder, ailerons, elevators, flaps, slats and the like can be provided along the wings, tail and/or vertical stabilizers to allow the flight vehicle to operate in a manner similar to an airplane when in the horizontal flight mode and to operate in a manner similar to a helicopter when in the vertical flight mode.

At the underside of the wings and/or fuselage, any suitable landing gear may be provided. In the illustrated embodiments three distinct and retractable landing gear assemblies 45, 46 and 47 are provided, each having wheels 45a, 46a, 47a which enable the assembled vehicle system to take off and land both a horizontal flight mode or a vertical flight mode, and for the gear to be positioned within the aircraft body during flight to reduce drag.

In various embodiments, the landing gear assemblies can include an electric motor for permitting the flight vehicle to travel along the ground independently from the road vehicle. Additionally, the landing gear assemblies can include height adjustment mechanisms 45b, 46b and 47b such as pneumatic or hydraulic struts, for example in order to selectively raise and lower the height and/or angle of the wings and fuselage areas of the flight vehicle when docking with the road vehicle.

Of course, other embodiments are contemplated wherein the main body includes a different shape and/or arrangement of wings, tail assembly and horizontal stabilizers, along with a different arrangement of flight control surfaces and landing gear assemblies.

A plurality of propulsion devices can be provided along the flight vehicle in order to provide sufficient thrust to the assembled vehicle system (e.g., when the flight vehicle is attached to the road vehicle) to sustain flight. In the preferred embodiment, the flight vehicle will be capable of sustained flight after the loss of one or more propulsion devices in order to ensure the safety of the vehicle and its occupants should an in-flight emergency occur.

To this end, one embodiment of the system 10 contemplates six propulsion devices 48, 49, 50, 51, 52, and 53 which can function to provide sustained flight to the assembled vehicle system with the loss of any two engines. In the preferred embodiment, each of the propulsion devices can include an electric engine 48a, 49a, 50a, 51a, 52a, 53a, and propeller assembly 48b, 49b, 50b, 51b, 52b, 53b, respectively that are powered by an onboard hydrogen fuel cell, batteries and/or other suitable power source that is stored within the fuselage or other parts of the flight vehicle. In one embodiment, the batteries or other power source located on the road vehicle can also be used to provide primary, additional or emergency power the flight vehicle components the docking plug.

In the preferred embodiment, one or more of the propulsion devices can rotate relative to the fuselage so as to selectively orient the propellers between a forward orientation (see FIG. 1) for horizontal flight, and a vertical orientation (see FIG. 4) for vertical flight. Such functionality allowing the assembled vehicle system to function as a Vertical Takeoff and Landing craft (VTOL). In this regard, a plurality of rotary axle mechanisms and associated driving mechanisms 48c, 49c, 50c, 51c, 52c, 53c can be provided along the fuselage in order to individually or cumulatively rotate the propellers and/or the entire propulsion devices. In one embodiment, the distal ends of the wings 42a, 42b, and the horizontal stabilizers 44 can rotate in conjunction with the connected propulsion devices.

One example of a suitable rotary axle mechanism and associated components suitable for performing the engine and component rotation to transition the assembled vehicle system between a horizontal flight mode and a vertical flight mode is described in U.S. Patent application No. 2011/0177748, to Luo, the contents of which are incorporated herein by reference.

Of course, other embodiments are contemplated wherein a different number of engines, type of engines (e.g., gas, turbine, jet, etc.), type of propellers (e.g., ducted) and/or type of rotational mechanisms are utilized, in order to operate the system in the manner described herein. Moreover, other embodiments are contemplated wherein one or more of the propulsion devices are not rotatable so as to allow the system to 1) operate as a VTOL craft using only some of the propulsion devices while others remain fixed upward or forward; 2) to operate the system in an airplane mode where all of the propulsion devices are fixed forward; or 3) to operate the system in a helicopter mode where all of the propulsion devices are fixed upward.

The flight vehicle can include an onboard controller 54 that is electrically and communicatively linked to each of the propulsion devices, flight control surfaces, rotary axle mechanisms and the below described connector pin receptacle via any number of communicative and power cables. As described herein, the onboard controller can include any number of discrete or integrated circuits such as computer processors, memory, user interface components and communication devices such as a wireless transceiver (e.g., cellular transceiver, Wi-Fi transceiver, Bluetooth transceiver, etc.).

In one embodiment, the onboard controller 54 can include, or can be connected to any number of integrated or discrete avionics for permitting safe flight in any airspace. Several nonlimiting examples of onboard avionics can include, but are not limited to altimeter detection systems, flight speed indicator systems, angle of attack indicator systems, location identification systems such as a GPS antenna and receiver, radio systems, ADS-B transceivers, landing lights, positioning lights, terrain avoidance warning systems, collision avoidance systems, a flight transponder system, radar, and other such items which may be required to obtain Federal Aviation Administration (FAA) certification in the United States or equivalent certifications in other governing bodies.

In the preferred embodiment, the onboard controller 54 alone or in combination with the vehicle control system 24 can include functionality for allowing a user operating the operator controls within the road vehicle to manually fly the assembled vehicle system and/or to permit the assembled vehicle system to fly autonomously and/or semi autonomously from one location to another. More specifically, the vehicle can be constructed with components and software necessary to fly between locations using the digital highway system that is currently under development by the Federal Aviation Administration.

In either instance, the air vehicle will preferably be manufactured to meet or exceed all applicable safety requirements outlined by Federal Aviation Administration and the National Transportation Safety Board (NTSB) and/or other governing bodies so as to be certified to operate as a private or commercial aircraft.

FIGS. 6-9 illustrate one embodiment of the docking and undocking features of the system 10. As shown, a plurality of docking sensors 61, such as various optical sensors, cameras, ultrasonic sensors, proximity sensors, and the like can be positioned along the flight vehicle in order to aid in docking with the road vehicle. In the preferred embodiment, the docking procedure will be conducted autonomously wherein the flight vehicle and/or road vehicle moves in the manner described below without human intervention. In such a scenario, feedback from the vehicle sensors 25 and the docking sensors 61 can be sent to the respective controllers 24 and 54. These controllers can communicate wirelessly via the respective transceivers to align the vehicle and flight vehicle and to operate the respective docking clamps.

Of course, other embodiments are contemplated wherein the docking procedure can be performed manually via the operator controls to move the road vehicle directly and/or the flight vehicle remotely.

Figure 7:
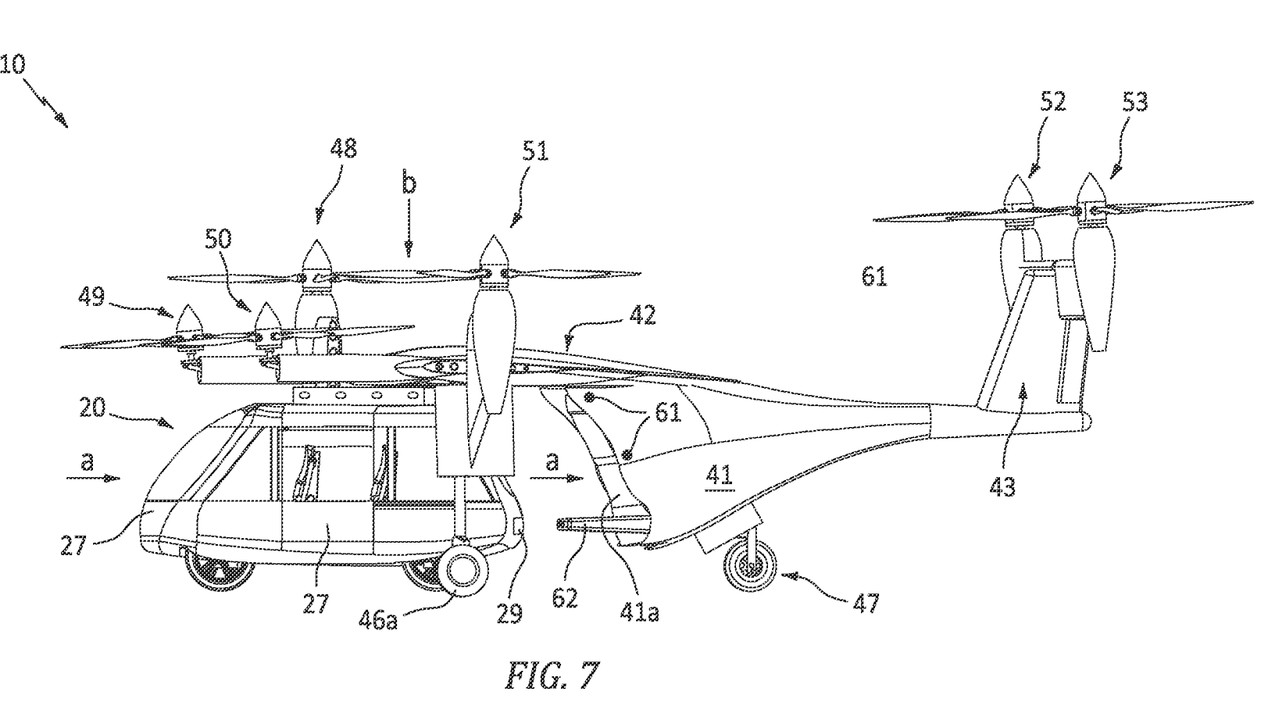
FIG. 7 is a side view of the flight vehicle and the flight vehicle in a docking procedure, in accordance with one embodiment of the invention.

In either instance, the landing gear assemblies can be constructed so as to position the bottom surface of the wings at a height that is complementary to or slightly higher than the height of the road vehicle 20 in order to allow the vehicle to drive beneath the wings and dock with the flight vehicle in accordance with the precise instructions provided by the sensors 25 and/or 61.

In one embodiment, the front end of the fuselage 41*a* located beneath the wings can include a shape and a size that is complementary to the shape and the size of the back end of the road vehicle, and an elongated catch tongue 62 having a connector pin receptacle 63 can extend forward from the fuselage surface 41*a*.

In one embodiment, the catch tongue 62 can include a shape and size that is complementary to the shape and size of the docking aperture 29 and the frame opening 28*a* located on the back end of the road vehicle, so as to permit the tongue to be inserted through the aperture as the vehicle 20 backs toward the front end of the fuselage 41*a* (see arrow a). When the back end of the vehicle is positioned against the front end of the fuselage 41*a*, the connector pin receptacle 63 can engage the docking plug 33 in order to permit the vehicle controller 24 to communicate with the flight vehicle controller 54.

When so positioned, the docking rails 31 and 32 located along the top surface of the road vehicle 20 can be positioned directly beneath openings 64 and 65 located on the bottom surface 42*c* of the wings, and the flight vehicle can be lowered (see arrow b) via the height adjustment mechanisms 45*b*, 46*b* and 47*b* until the rails are located within the openings.

Figure 8:
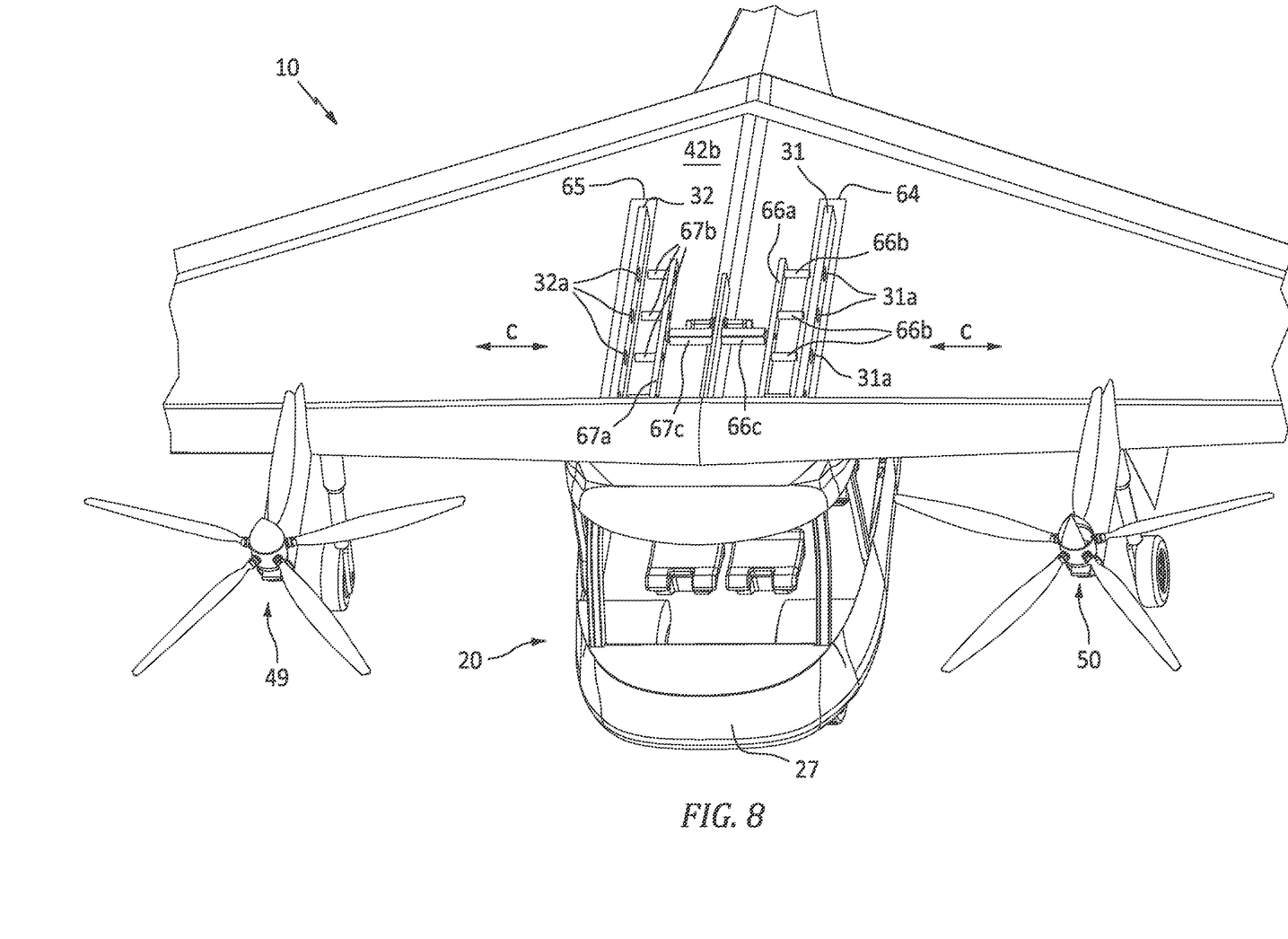
FIG. 8 is a top cutout view of the flight vehicle with the top portion of the wings removed, in accordance with one embodiment of the invention.

As shown best at the cutout view of FIG. 8 where the upper surface of the wing is removed for ease of illustration, a pair of docking clamps can be located within the wing body at locations adjacent to the openings 64 and 65. In one embodiment, each of the docking clamps can include a generally T-shaped body 66*a* and 67*a* having a plurality of rods 66*b* and 67*b*, respectively extending outward therefrom.

A pair linear motors 66*c* and 67*c* such as hydraulic, electric, or pneumatic linear actuators, for example can be connected to the T-shaped body and can function to selectively extend and retract the rods 66*b* and 67*b* toward and away from the docking rails (see arrows c). Each of the rods can include a shape, size and separation distance that is complementary to the shape, size and separation distance of the openings 31*a* and 32*a* on the docking rails 31 and 32, respectively.

Figure 9:
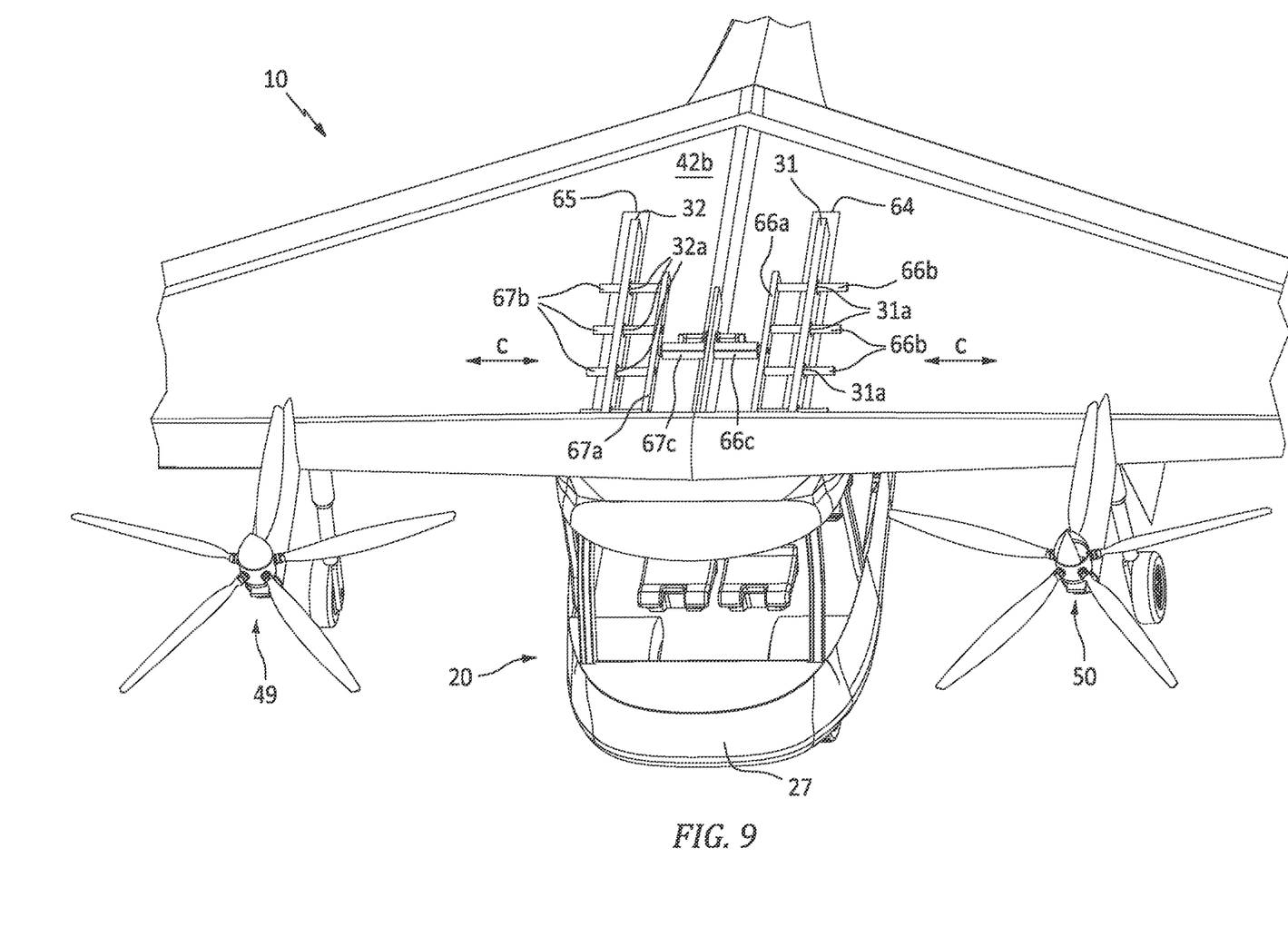
FIG. 9 is another top cutout view of the flight vehicle with the top portion of the wings removed, in accordance with one embodiment of the invention.

As shown at the cutout view of FIG. 9 where the upper surface of the wing is also removed for ease of illustration, when the linear motors are in the fully extended position, each of the rods 66*a* and 66*b* will be located within or will extend through one of the openings 31*a* and 32*a*, respectively of the docking rails. When so positioned, the road vehicle 20 is mechanically and communicatively coupled to the flight vehicle 40 such that the assembled vehicle system 10 is capable of flying in both the horizontal and vertical flight modes.

Although described above with the docking clamps located within the main body of the wings so as to require the flight vehicle to be raised and lowered in order to align the docking clamps with the docking rails, this is but one possible arrangement of components. To this end, other embodiments are contemplated wherein the docking clamps are positioned beneath the wings such that the docking clamps and rails are positioned parallel to each other so as to align the rods 66*b*/67*b* and openings 31*a*/32*a* when the vehicle is backed into the tongue. Such a feature eliminating the need for the flight vehicle to be raised or lowered.

In such an embodiment, it is noted that the rails 31 and 32 may be positioned at other locations along the road vehicle, such as along the upper sides of the vehicle, for example, rather than extending upward therefrom. Of course, any number of other components and arrangements of components capable of securely joining the road vehicle to the flight vehicle to permit flight operations are also contemplated.

Figure 10:
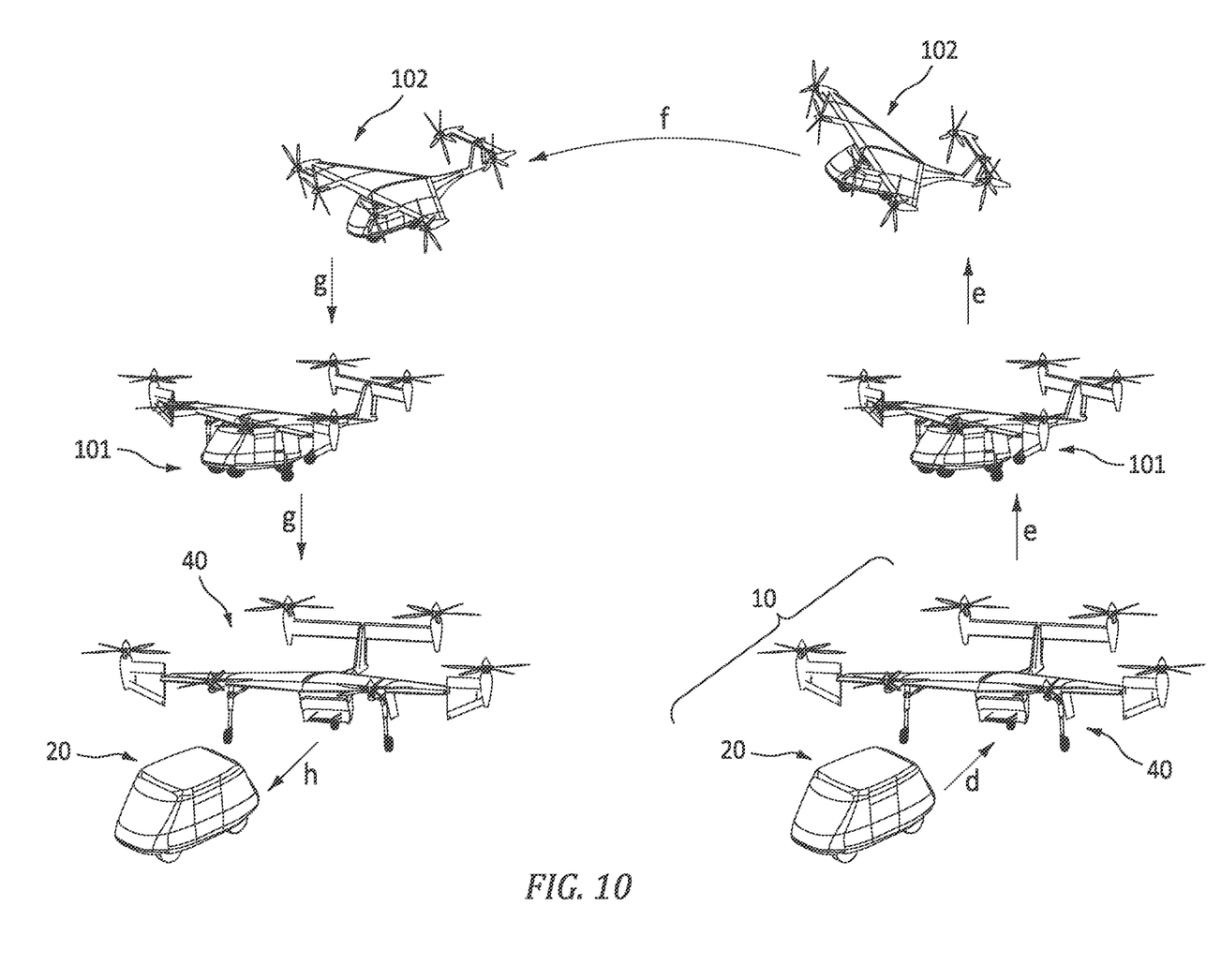
FIG. 10 is an exemplary operating environment for the air and road vehicle system, in accordance with one embodiment of the invention.

FIG. 10 illustrates one exemplary operating environment 100 demonstrating the capabilities of the air and road vehicle system 10, in order to enable a user to travel via both road and airways while remaining within the same passenger cabin. In this regard, the road vehicle 20 can dock (see arrow d) with the flight vehicle 40 in the manner described above. Once docked, the assembled vehicle system 10 can enter into a vertical flight mode 101, wherein each of the propulsion devices are oriented vertically to enable vertical flight in a manner similar to a helicopter (see arrows e). Once reaching a specific altitude the system can transition to horizontal flight mode 102 wherein the propulsion devices are oriented horizontally in order to operate similar to an airplane.

In various embodiments, the air vehicle and the road vehicle can function independently from each other such that the air vehicle can be summoned to the location of the road vehicle and vice versa. Additionally, the road vehicle can be multi directional and can be docked to the air vehicle without having to be reversed into position.

In the preferred embodiment, the system can utilize a plurality of Luftcar terminals, each having landing pads and/or runways for use by the assembled vehicle system when taking off and landing. As noted above, the assembled vehicle system will preferably be capable of automated flight using the onboard avionics and flight routing outlined in the digital highway system that is currently under development by the Federal Aviation Administration. However, in certain instances, the craft may be piloted directly by a user within the cabin of the attached road vehicle via the operator controls.

In either instance, upon nearing the intended destination shown by arrow f, the system can return to the vertical flight mode 101 and descend (arrows g) in order to land. Upon landing, the road vehicle 20 can disconnect from the flight vehicle 15 by reversing the docking steps (e.g., disengaging the docking clamps and driving away from the tongue catch). Upon separation, the road vehicle can be driven (see arrow h) to any desired location while the flight vehicle remains at the landing terminal. As noted above, the road vehicle can be configured for autonomous driving and/or can be manually driven via the onboard operator controls.

Accordingly, the above-described system provides a novel multi-modal air and road vehicle system for eliminating current traffic and route planning concerns that is not rendered obvious by any known art.

As described herein, one or more elements of the road vehicle 20 and/or the flight vehicle 40 can be secured together utilizing any number of known attachment means such as, for example, screws, glue, compression fittings and welds, among others. Moreover, although the above embodiments have been described as including a plurality of separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A vehicle system, comprising:
   a road vehicle having a chassis, a plurality of wheels, an engine, a top end, a back end, and a cabin area;
   a flight vehicle having a main body and at least one propulsion device;
   a plurality of docking mechanisms that are positioned along each of the road vehicle and the flight vehicle, said plurality of docking mechanisms being configured to selectively join the road vehicle to the flight vehicle;
   a catch tongue that protrudes outward from the main body of the flight vehicle;
   an opening along the back end of the road vehicle, said opening having a shape and a size that is complementary to a shape and a size of the catch tongue;
   a docking plug that is positioned within the road vehicle, said docking pin being configured to communicate with a road vehicle controller; and
   a connector pin receptacle that is positioned along the catch tongue, said connector pin receptacle being configured to communicate with a flight vehicle controller,
   wherein the plurality of docking mechanisms include a pair of rails that are positioned along the top end of the road vehicle, each of the pair of rails comprising one or more openings,
   wherein the plurality of docking mechanisms include a pair of docking clamps located along the flight vehicle, each of the docking clamps including at least one laterally extendable rod,
   wherein in a disconnected orientation, the road vehicle is configured to drive on land, and in a connected orientation, the flight vehicle and the road vehicle are configured to takeoff, fly and land, and
   wherein in the connected orientation, the at least one laterally extendable rod is in communication with the at least one or more opening.

2. The system of claim 1, wherein each of the pair of docking clamps are configured to engage one of the pair of rails when the system is in the connected orientation.

3. The system of claim 1, wherein the flight vehicle includes a pair of wings and at least one flight control surface.

4. The system of claim 3, wherein the plurality of docking mechanisms include a pair of docking clamps located along the wings of the flight vehicle.

5. The system of claim 4, wherein each of the pair of docking clamps are configured to engage one of the pair of rails when the system is in the connected orientation in order to secure the top end of the road vehicle to a bottom surface of the wings.

6. The system of claim 1, wherein in the connected orientation, the catch tongue is positioned through the opening,
the docking plug is connected to the connector pin receptacle, and
the road vehicle controller is communicatively linked with the flight vehicle controller.

7. The system of claim 1, wherein the flight vehicle is configured to operate in a vertical flight mode.

8. The system of claim 7, wherein in the vertical flight mode, each of the at least one propulsion devices are configured to impart a lifting force sufficient to lift the connected flight vehicle and road vehicle vertically.

9. The system of claim 1, wherein the flight vehicle includes wings and a plurality of flight control surfaces.

10. The system of claim 9, wherein the flight vehicle is configured to operate in a horizontal flight mode.

11. The system of claim 10, wherein in the horizontal flight mode, each of the at least one propulsion devices are configured to generate thrust sufficient for the wings to lift the connected flight vehicle and road vehicle through the air in sustained horizontal flight.

12. The system of claim 1, wherein the road vehicle includes functionality for driving autonomously from a first location to a second location.

13. The system of claim 1, wherein the flight vehicle includes functionality for flying autonomously from a third location to a fourth location.

14. The system of claim 1, further comprising:
landing gear that is positioned along the flight vehicle.

15. The system of claim 14, wherein the landing gear is retractable.

* * * * *